(No Model.)
J. KOEGEL.
PLANT THINNER AND WEEDER.
No. 565,906. Patented Aug. 18, 1896.
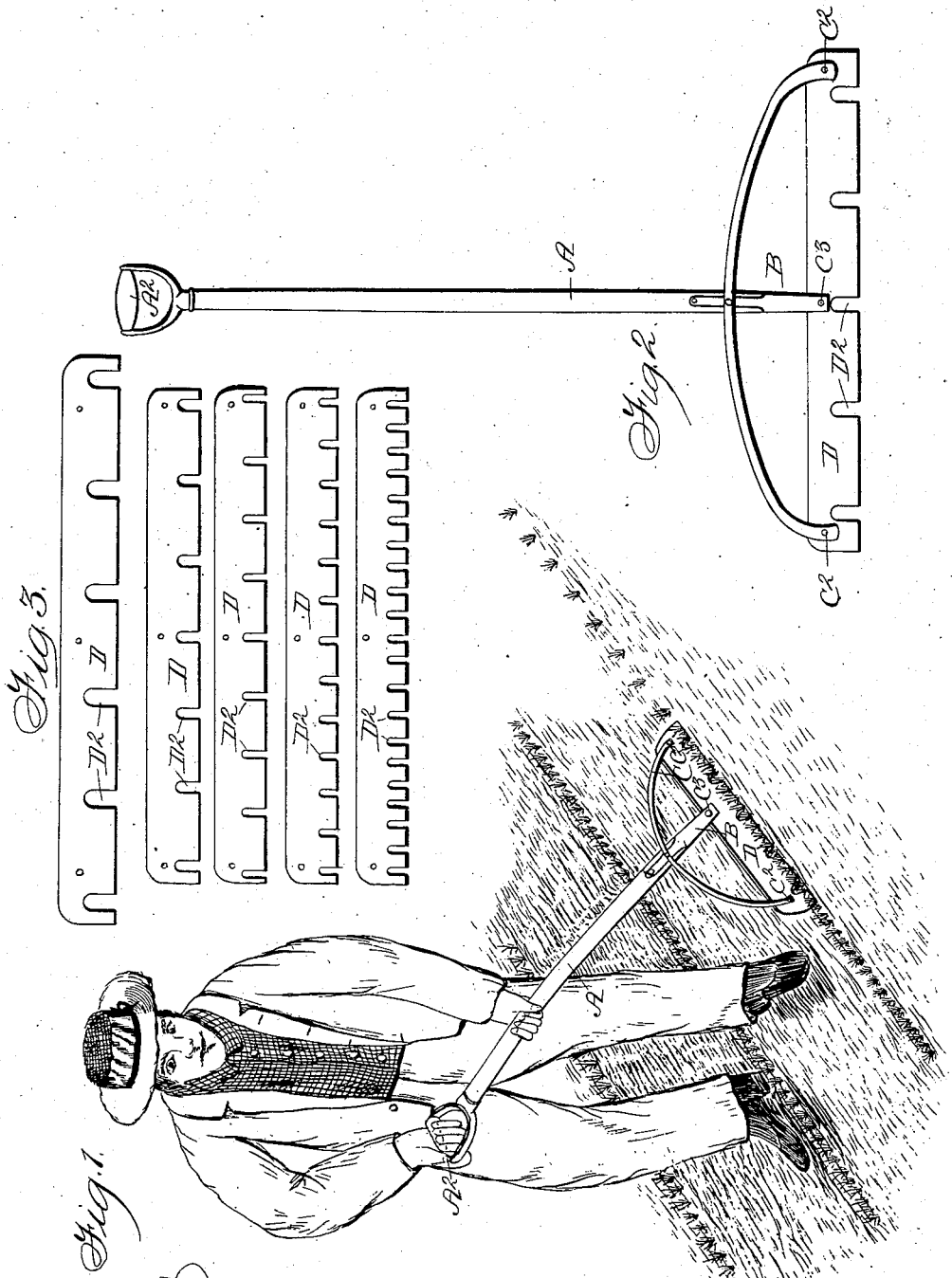

UNITED STATES PATENT OFFICE.

JULIUS KOEGEL, OF DES MOINES, IOWA.

PLANT THINNER AND WEEDER.

SPECIFICATION forming part of Letters Patent No. 565,906, dated August 18, 1896.

Application filed January 18, 1896. Serial No. 576,013. (No model.)

*To all whom it may concern:*

Be it known that I, JULIUS KOEGEL, a citizen of the United States of America, residing at Des Moines, in the county of Polk and State of Iowa, have invented a new and useful Apparatus for Thinning Plants, of which the following is a specification.

Heretofore cutters have been fixed to the handle or frame of a hoe at regular spaces apart in such a manner that the cutters could be pulled across a row of plants to cut out the plants in the line of the cutters as required to thin a row of plants; but in such operation the frame or back of the hoe would come in contact with the plants that were not cut out and by such contact damage delicate plants and retard their growth.

My object is to cut out and thin a row of plants by a forward motion of a handle that carries cutters and to detachably connect interchangeable cutters with the handle as required to be adapted for thinning different kinds of plants at different times and to govern the width of spaces between the plants that are to remain in a row.

My invention consists in the apparatus hereinafter set forth, pointed out in my claim, and illustrated in the accompanying drawings, in which—

Figure 1 shows the position of the handle and cutters relative to a row of plants as required in the practical use of my invention. Fig. 2 is a view showing the manner of detachably connecting the blades with the handle, and Fig. 3 shows a series of blades adapted for different kinds of plants and also adapted to be interchangeably connected with the handle.

Referring to the accompanying drawings, the reference-letter A is used to indicate a wooden handle having a grip $A^2$ at its top at right angles, and a metal socket B at its lower end, slotted and perforated.

C indicates a yoke bolted to the top of the socket and extended downward in the plane of the handle to terminate in straight perforated ends and in alinement with the lower end of the socket. Bolts $C^2$ are passed through openings in said ends and a bolt $C^3$ through the perforation in the socket to detachably fasten interchangeable blades to the handle and the straight ends of the yoke in such a manner that the blades will project downward or forward in the plane of the handle and the yoke that is in alinement with the handle.

The blades D of the tool are each preferably made of flat pieces of steel of any suitable length and perforated at its central portion and ends to receive the bolts $C^2$ and $C^3$, and thus be firmly secured to the handle. The lower edge of the blade is sharpened and in its edge are formed a series of inverted-U-shaped openings $D^2$, placed at regular intervals apart. In Fig. 3 are shown a number of these blades, each having the openings of different widths and at different distances apart. It is obvious that one blade may be readily and quickly substituted for another and thus the plants thinned to any desirable distance, or rows already planted at equidistant spaces weeded and cultivated.

In practical use, assuming that it is desired to thin a row of plants, the operator selects the blade having its openings at the distance of separation that it is desirable to have the plants. He then advances over a field parallel with the rows and forces the tool through the ground in the row and then draws same backwardly; thus cutting out the roots of the plants and weeds that did not enter the spaces. The tool is then advanced parallel with the row and the notch on one end made to admit the last plant left by the previous cut, thus insuring regularity and equal spacing throughout the entire row. It is obvious that by thus simply cutting under the ground and then withdrawing the tool the probability of injuring the plants that it is desired to save is much less than when pulling out the superfluous plants by the roots by hand.

Having thus described my invention, what I claim as new therein, and desire to secure by Letters Patent of the United States therefor, is—

A hand implement, comprising a handle having a bifurcated lower end, a yoke fixed to the handle and its ends in alinement with the bifurcated end of the handle and adapted for detachably connecting blades therewith so as to project forward in the plane of the yoke and handle, and a series of interchangeable blades each having a different number of cutters and the cutters at different distances apart, substantially as shown and described to operate in the manner set forth.

JULIUS KOEGEL.

Witnesses:
J. RALPH ORWIG,
THOMAS G. ORWIG.